2 Sheets—Sheet 1.

J. W. COREY.
Tension and Thread Controlling Device for Sewing Machines.

No. 239,031. Patented March 22, 1881.

Witnesses:
J. P. Th. Lang.
J. F. Munson.

Inventor:
Jasper W. Corey
by
Mason Fenwick Lawrence
Attys

N. PETERS, PHOTO-LITHOGRAPHER, WASHINGTON, D. C.

J. W. COREY.
Tension and Thread Controlling Device for
Sewing Machines.

No. 239,031. Patented March 22, 1881.

Witnesses:
J. P. Th. Lang.
J. F. Munson.

Inventor:
Jasper W. Corey
by
Mason Fenwick & Lawrence
Attys.

UNITED STATES PATENT OFFICE.

JASPER W. COREY, OF CHICAGO, ILLINOIS.

TENSION AND THREAD-CONTROLLING DEVICE FOR SEWING-MACHINES.

SPECIFICATION forming part of Letters Patent No. 239,031, dated March 22, 1881.

Application filed July 9, 1879.

*To all whom it may concern:*

Be it known that I, JASPER W. COREY, of Chicago, in the county of Cook and State of Illinois, have invented a new and useful Improvement in Tension and Controlling Devices for the Needle-Thread of Sewing-Machines, which improvement is described in the following specification and drawings, in which latter—

Figure 1:
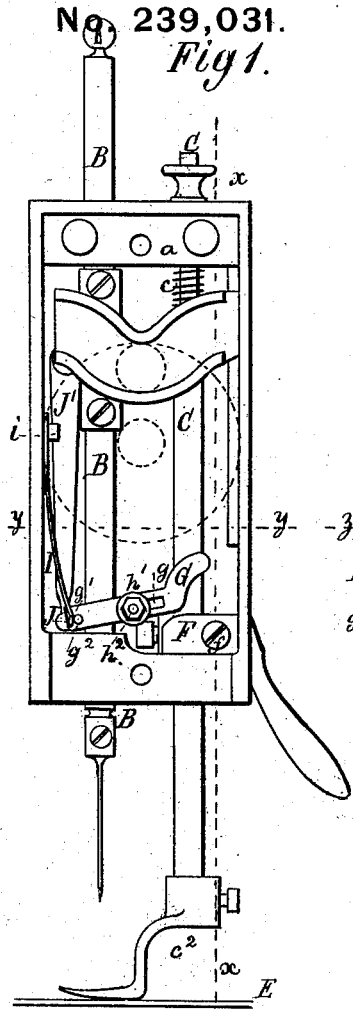
Figure 2:
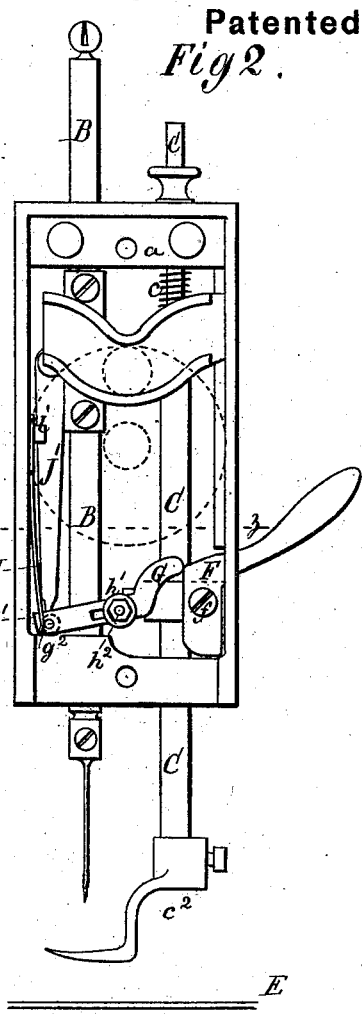
Figure 3:
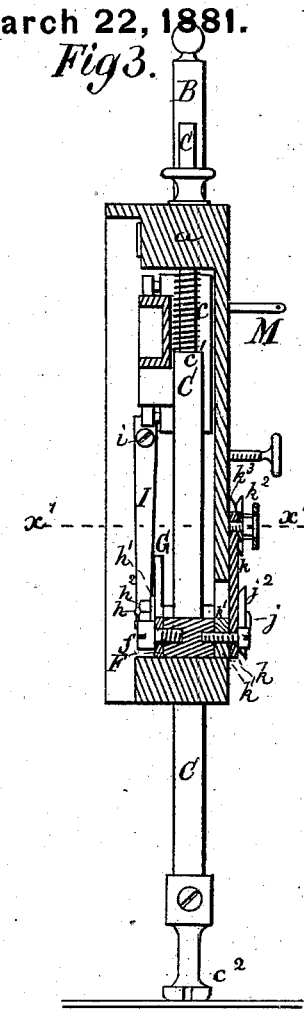
Figure 4:
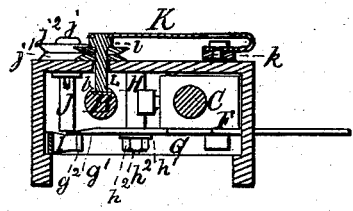
Figure 5:
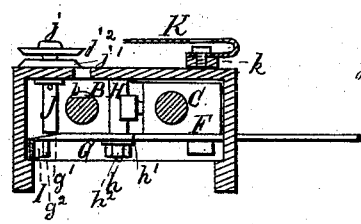
Figure 6:
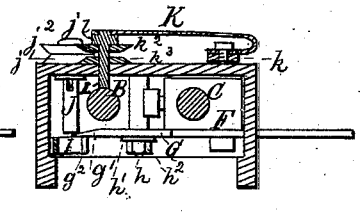
Figure 7:
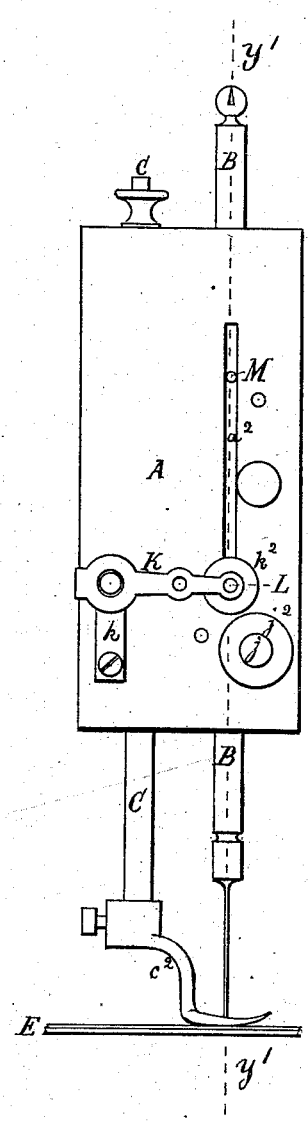
Figures 8, 9:
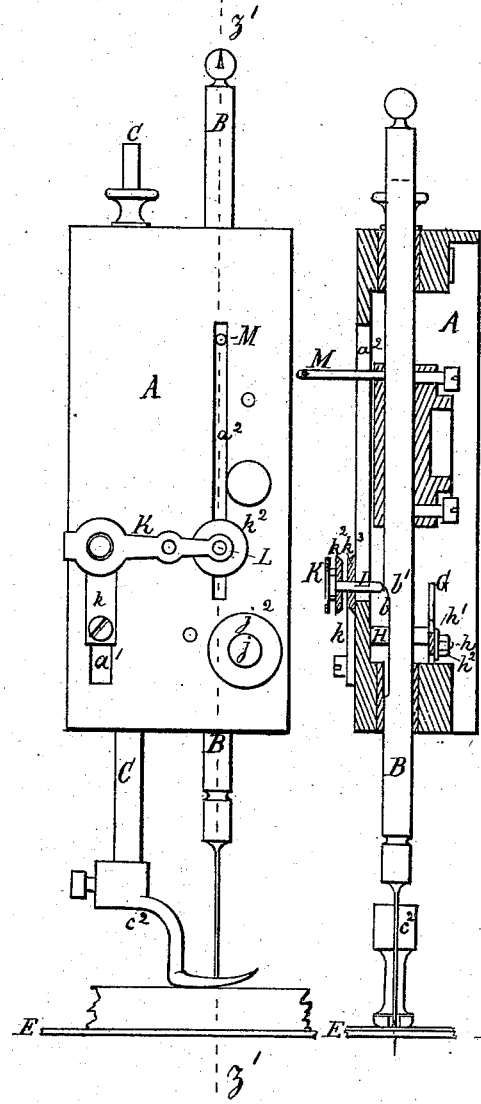
Figure 10:
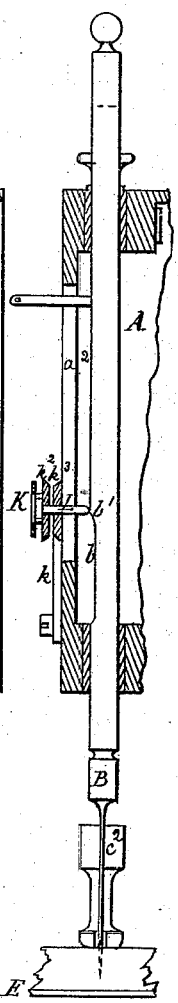

Figure 1 is a back view of the front or faceplate of the bracket of a sewing-machine as it appears when detached from the bracket, showing the needle-bar in its highest and the presser-bar in its lowest position. Fig. 2 is a similar view, showing both the needle-bar and the presser-bar at their highest positions. Fig. 3 is a vertical transverse section in the line $xx$ of Fig. 1. Fig. 4 is a horizontal section in the line $yy$ of Fig. 1, looking down. Fig. 5 is a horizontal section in the line $zz$ of Fig. 2, looking down. Fig. 6 is a horizontal section in the line $x'x'$ of Fig. 3. Fig. 7 is a front view of the front or face plate of the bracket, showing the presser-bar down and the needle in the act of entering the fabric. Fig. 8 is a similar front view, showing a piece of thick fabric upon the sewing-machine table and the presser-foot and needle-bar at a greater altitude than that shown in Fig. 7, the needle-eye being just above the fabric. Fig. 9 is a vertical section in the line $y'y'$ of Fig. 7; and Fig. 10 is a vertical section in the line $z'z'$ of Fig. 8.

The first part of my invention consists in an automatic tension-regulator operated through certain devices by the lifting cam-lever of the presser-bar, whereby when the presser-bar is raised to its greatest altitude by the action of the said lifting cam-lever the tension is released, while when the presser-bar is kept at a considerable elevation by the thickness of the fabric sewn and the lifting cam-lever is not acted upon by hand, the tension will remain unchanged.

The second part of my invention consists in an automatic slack-thread controller, combined with the presser-bar by suitable devices, whereby when the presser-bar is raised the controller is moved upward with it and automatically adjusts itself with respect to the highest shoulder of a depression in the needle-bar, so that the length of the thread between the controller and the eye of the needle remains the same, and the thread is always always released when the eye of the needle is on a level with the top of the fabric, no matter what the thickness of the fabric may be.

My present tension-releasing device possesses an advantage over the one recently patented by me, in that the elevation of the presser-bar, by means of a thick fabric, does not interfere with the proper operation of said tension-releaser, and consequently the pivot of the tension-disks does not require to be moved out of the way by hand when the fabric is thick, as is the case in my said patented device, and my automatic thread-controller possesses an advantage over other thread-controllers operated by the needle-bar but fastened to the front or face plate, in that it provides the required tension for drawing the stitches tight, and even as soon as the needle leaves the fabric sewn, no matter whether the fabric be thick or thin, whereas the controllers heretofore known and used serve the above-mentioned purpose only for comparatively thin fabrics.

In the drawings, A represents the front or face plate, B the needle-bar, C the presser-bar, and E the table of a sewing-machine.

The downward pressure of the pressure-bar C is effected by an ordinary spring, $c$, confined between the top $a$ of the front plate, and a suitable shoulder, $c'$, of the presser-bar. The lower end of the presser-bar is provided with an ordinary presser-foot, $c^2$. An ordinary lifting cam-lever, F, suitably pivoted at $f$ to a block attached to the presser-bar, serves as the means for elevating the same, and for keeping it at its highest elevation when no sewing is being done. In line with the said lifting cam-lever F a slide, G, is, by means of a slot, $g$, secured to a guide-pin, $h$, of a stud, H, of the front or face plate, A, and this slide is laterally confined between a shoulder of the stud H and a washer, $h'$, and nut $h^2$, of the pin $h$. One end of the slide G is beveled, as seen at $g'$, in Figs. 4, 5, 6, and is provided with a pin, $g^2$, against which a spring, I, bears, the upper end of which spring is suitably fastened to the front or face plate, as at $i$. The beveled end $g'$ of the slide stands opposite the inner end of the center pin, J, of the tension-disks $j'$ $j^2$ of an ordinary tension device. The pin J is passed through the front or face plate, and its outer end is provided with a head, $j$, between which and the face of the front or face plate the disks $j'\,j^2$ are confined. To the inner portion of the pin J a tension-spring, J', is secured in a suitable manner, which spring is fastened to the front or face plate. When the presser-bar is down the spring I keeps the slide G out of contact with the pin J; but when the presser-bar is raised by means of the lifting cam-lever F the back of the cam-lever comes in contact with the slide G and pushes it against the spring I and the end of pin J, which latter is pushed by the advancing beveled end $g'$ against its tension-spring J', thereby releasing the disks $j'\,j^2$ from pressure. When the presser-bar is let down the slide G is pushed back by the spring I to its normal position, and the tension of the disks $j'\,j^2$ is re-established.

The presser-bar C is also provided with a transverse spring, K, in front of the plate A, which spring is connected to a plate $k$ and slide $k'$, which latter moves in a vertical slot, $a'$, of the front or face plate. The free end of the spring K is provided, just opposite the needle-bar B, with a pin, L, which passes through the downwardly-extended slot $a^2$ of the take-up to the needle-bar.

Between the spring K or a suitable collar, $l$, of the pin L and the front or face plate, A, two disks, $k^2\,k^3$, are confined to the pin L, thus forming the thread-controller. When the needle is in the fabric the pin L bears upon the round surface of the bar B, and is thereby forced outward, releasing the disks $k^2\,k^3$. When the needle is above the fabric the pin L stands opposite a depression, $b$, of the needle-bar, against the surface of which depressed portion of the bar it cannot bear, inasmuch as it is too short to reach the same, and this being so the spring K is permitted to compress the disks $k^2\,k^3$, and cause them to produce tension upon the needle-thread. A short inclination, $b'$, forms the upper termination of the depression $b$, and this inclination is so placed on the needle-bar that its junction with the cylindrical surface of the needle-bar stands in the center line of the pin L when the eye of the needle is in line with the surface of the fabric. Thus the controlling tension of the needle-thread ends during the downstroke of the needle before the needle-eye enters the fabric, and it begins during the upstroke of the needle, when the needle-eye leaves the fabric.

The needle-bar may be provided with an ordinary take-up, M, which will move in the slot $a^2$, and operate in the usual manner.

I am aware that it is not new to arrange two disks which produce tension upon a sewing-machine thread upon a stationary pin, and to have one of these disks bear against a spiral spring arranged upon the pin which supports the disks, and to spread these disks apart by means of the lifting cam-lever of the presser-bar. A contrivance of the character described was patented February 25, 1879, by T. Shanks. My invention differs from this patented plan of Shanks in the following particulars: The pin carrying the disk's slides is operated by a wedge device which acts upon the back of the pin and is arranged completely out of the way of the thread which is passed between the disks, whereas with the patented plan referred to the thread and the arm of the lever which enters between the disks are liable to be in the way of each other during the operation upon the presser-bar and tension device by the said lever and its extension-arm. I do not, therefore, claim a tension device which has its disks separated by means of an arm of the lever, which arm enters between the disks when the lever is operated to raise the presser-foot and separates the disks; but

What I claim is—

1. The combination of the intermediate tension-releasing device G and its spring, the tension device consisting of a sliding pin, two disks, and a spring, the hand cam-lever F, and the presser-bar, whereby the means for releasing the tension upon the thread are applied out of the way of the thread, and still operate to automatically release the thread from tension when the lifting cam-lever has raised the presser-bar to its fullest extent, substantially as described.

2. The combination, with the presser-bar C and needle-bar B, provided with a depression, $b\,b'$, of a thread-controller and means for attaching the controller directly to the presser-bar, whereby the controller is automatically adjustable to thick and thin goods being sewed, and in any of its adjusted positions acts to hold the thread of the needle taut until the eye of the needle is about on a level with the top of the presser-foot or surface of the goods being sewed, and then release its hold upon the thread, as described.

3. The combination, with a tension device consisting of two disks, a pin on which said disks are mounted, and which is constructed to slide longitudinally, and a spring engaging said pin and serving to press said disks together, of a cam-lever for raising the presser-foot, a sliding bar located within the head of the machine, and a device adapted to act in connection with said cam-lever and sliding bar, whereby the tension of the needle-thread is released when the presser-foot is raised, and applied when said foot is lowered, substantially as described.

Witness my hand in the matter of my application for a patent for improvement in sewing-machines.

JASPER W. COREY.

In presence of—
  J. P. THEODORE LANG,
  H. W. HALL.